United States Patent [19]

Inculet

[11] Patent Number: 4,700,262

[45] Date of Patent: Oct. 13, 1987

[54] CONTINUOUS ELECTROSTATIC CONVEYOR FOR SMALL PARTICLES

[75] Inventor: Ion I. Inculet, London, Canada

[73] Assignee: Canadian Patents and Development Limited, Ottawa, Canada

[21] Appl. No.: 865,861

[22] Filed: May 22, 1986

[30] Foreign Application Priority Data

May 31, 1985 [CA] Canada .................................. 482970

[51] Int. Cl.⁴ .............................................. H05H 1/00
[52] U.S. Cl. ...................................... 361/233; 60/202
[58] Field of Search ...................... 60/202; 310/11, 14; 417/48, 49; 361/233, 234

[56] References Cited

U.S. PATENT DOCUMENTS

| | | | |
|---|---|---|---|
| 3,225,236 | 12/1965 | Meyer | 60/202 X |
| 3,708,248 | 1/1973 | Haldeman | 417/48 |
| 3,778,678 | 12/1973 | Musada . | |
| 3,872,361 | 3/1976 | Musada . | |
| 4,389,165 | 6/1983 | Ono et al. | 417/49 |

*Primary Examiner*—Donald A. Griffin
*Attorney, Agent, or Firm*—Edward Rymek

[57] ABSTRACT

The electrostatic conveyor consists of a duct having an inlet and an outlet, and apparatus for generating travelling, curvilinear, AC fields along the length of the duct. Charged particles, of conductive or non-conductive materials, under electrostatic forces, are exposed to unidirectional, centrifugal forces so that they are moved along the duct from the inlet to the outlet.

7 Claims, 1 Drawing Figure

CONTINUOUS ELECTROSTATIC CONVEYOR FOR SMALL PARTICLES

BACKGROUND OF THE INVENTION

This invention is directed to the conveying of small particles from one location to another and in particular to a conveyor which uses electric fields to provide the translation motion to the charged particles.

The conveying of small particles is an important industrial operation which is generally accomplished by a moving belt, a screw or other mechanical devices. In the process the fine particles enter between the various mechanical parts and depending on their abrasiveness the life of the mechanical conveyor is either limited or the conveyor itself requires substantial maintenance.

In addition to mechanical conveyors there are electromagnetic conveyors which accomplish the translational motion of the material by means of a special vibration. Such feeders have stationary electrical coils for energizing the vibration. The limitations of this type of feeder are in their large mass which is needed for the vibration by means of magnetic fields.

Finally a short electrostatic conveyor has been developed by Senichi Musada and has been described in U.S. Pat. No. 3,778,678 which issued on Dec. 11, 1973, and in U.S. Pat. No. 3,872,361 which issued on Mar. 18, 1976. This conveyor consists of a tubular duct of insulating material having elongated electrodes curved concentrically about the duct as axially spaced rings or interwound spirals. The electrodes are connected with the terminals of an alternating current source to produce a wave-like electric field within the duct by which the particles are repelled from the inner duct surface and repulsively propelled in one lengthwise direction along the duct. In this system centrifugal forces are used to hold the charged particles in suspension while the electric field reversals cause the rotation which lead to unidirectional movement.

SUMMARY OF THE INVENTION

It is therefore an object of this invention to provide an electrostatic conveyor for charged particles.

This and other objects are achieved by providing a duct having an inlet and an outlet, and a source for generating travelling, curvilinear, AC fields within the duct to move the charged particles from the inlet to the outlet. The curvilinear direction of the fields is established to be in the conveying direction from the inlet to the outlet. The fields may include two or more separately generated fields that are successively and alternately generated along the length of the duct.

In accordance with one aspect of the invention the field generating source may include a conductive plate in the upper surface of the duct, a succession of resistive electrode segments insulated from one another along the length of the lower surface of the duct, and a power supply connected to the resistive electrode segments to successively apply a potential across the segments in successive groups. The power supply may alternately apply a first voltage to a first group of selected segments and a second voltage to a second group of selected segments. The first and second voltages may be equal in amplitude.

Many other objects and aspects of the invention will be clear from the detailed description of the drawings.

DETAILED DESCRIPTION

Figure 1:
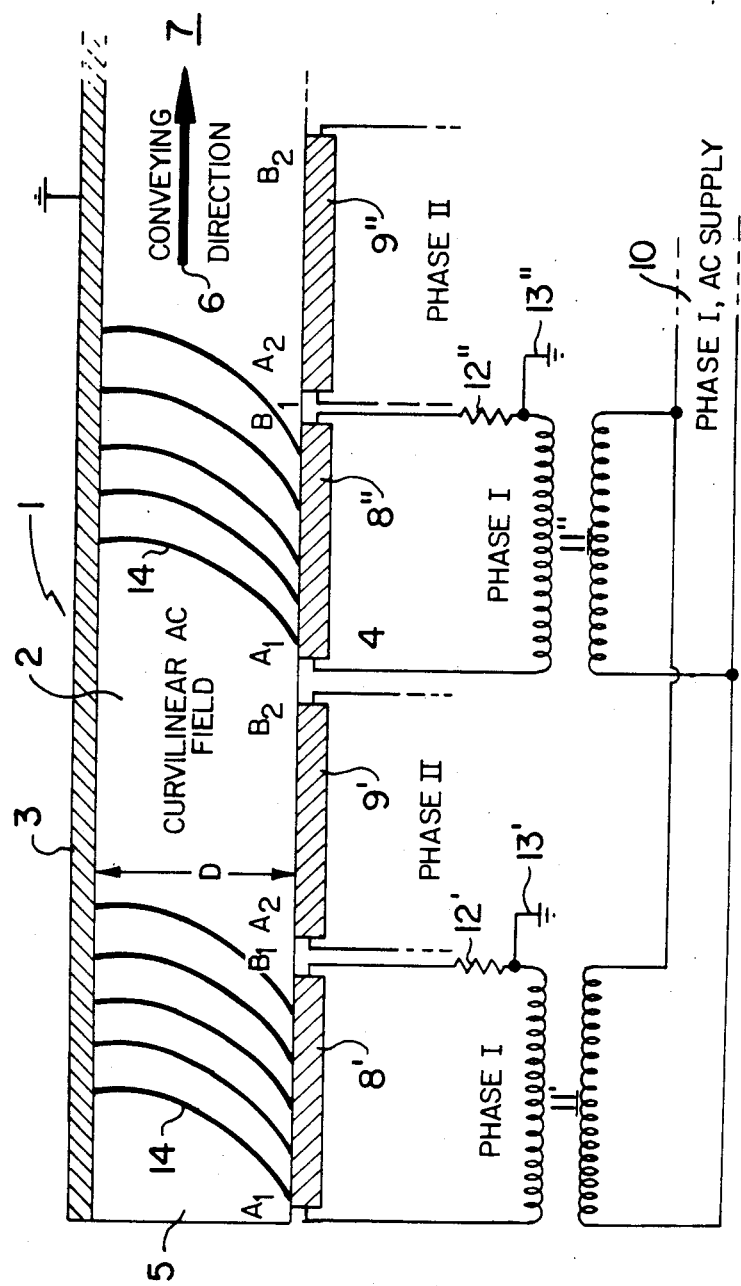
FIG. 1 is a schematic side view of the conveyor.

Though a two-phase energized conveyor 1 is shown schematically in FIG. 1, one or more phases may be used depending on its application and/or its length. The conveyor consists of a duct 2 formed by parallel upper 3 and lower 4 plates which define the upper and lower boundaries of the duct 2. The side walls (not shown) of the duct 2 need not be of any specific shape. The charged particles to be conveyed are placed into the duct at the inlet 5 and move in the direction shown by arrow 6 to the outlet 7.

The field that will move the charged particles is generated between the upper plate 3 and the lower plate 4. In this particular embodiment, upper plate 3 is a conductor which may be grounded as shown. The lower plate 4 has a number of alternating segments 8', 8" ... and 9', 9" ... which are insulated from one another. In addition, in order to obtain a potential gradient along each segments, i.e. between edges $A_1$—$B_1$ in segments 8', 8", ... and between edges $A_2$—$B_2$ on segments 9', 9" ..., they are made from resistive material such that a current will flow from edge A to edge B. The segments 8', 8", ... are all connected to an AC supply 10. Transformers 11', 11", ... and resistors 12', 12", ... allow a first potential difference to exist between edges $A_1$ and $B_1$ of segments 8', 8", ... and a second potential to exist between edge $B_1$ of segments 8', 8", ... and ground represented by 13', 13", ...

Segments 9', 9", ... are connected to an AC supply in the same manner as segments 8', 8", ..., the transformers, resistors and supply for segments 9', 9" ... have not been shown so as not to clutter and render FIG. 1 ambiguous. The power supply to which segments 9', 9" ... are connected may be a different phase of supply 10 or a completely different supply at an equal or different potential.

As described in the publication by Ion I. Inculet—Generation of Curvilinear Electrostatic Field From Parallel and Inclined Plane Elelctrodes—Conf. Rec. 1983, 18th Annual Meeting, IEEE Industry Applications Soc., Mexico City, Oct. 3-7, pp. 1122-1124, a curvilinear field may be produced by establishing a potential gradient along inclined plates or parallel plates. In FIG. 1, potential gradients are established by resistive electrodes 8', 8", ... 9', 9" ... because of the potential diference between their edges $A_1$—$B_1$ or $A_2$—$B_2$, and the curvature of the field is in the direction from the higher to the lower voltage.

In operation, curvilinear fields will be generated alternately in the group of segments 8', 8" ... and the group of segments 9', 9", ... to form a travelling field. Small charged particles are placed in the inlet 5 on the surface of segment 8'. They will vibrate along the curvilinear paths of the field lines 14. As the curvature of the field lines 14 is oriented in the same direction, the resulting centrifugal forces act in the same direction illustrated by arrow 6. In addition since the curvilinear fields from segments 8', 8" ... and from segments 9', 9" ... are alternately generated, the particles will continue to be conveyed in the same direction from segment to segment for any distance desired.

As an example, for the conveyance of charged particles up to 500 μm mean diameter, a potential difference of approximately 20 kV may be applied between edges $A_1$—$B_1$ or $A_2$—$B_2$ of the segments and a potential of approximately 10 kV may be maintained between edges $B_1$ or $B_2$ of the segments and ground by the resistors 12', 12" . . . The degree of curvature of this field will be dependent upon the length of the segments $A_1$—$B_1$ and $A_2$—$B_2$ relative to the separation distance D, to the ground plate 3.

A time lag of $(\pi/2)$ radian between the two phases or supplies will generate a form of travelling, curvilinear electric field, resulting in centrifugal forces at all points of the conveyor 1.

The speed at which the material is conveyed will depend on the length of the different segments 8', 8" . . . and 9', 9" . . . and the frequency at which the AC potential is applied alternately to one or the other groups of segments. Each phase potential has its own constant frequency which could be anywhere from 10 to 60 Hz. Certain materials may be conveyed most efficiently at predetermined frequencies. It is worth noting that the frequency of the two sets of segments phases need not be the same.

The frequency of alternation of the two phases could be varied widely (e.g. 0.1 to 5 Hz).

It is further to be noted that because of the unique properties of the forces generated by electric fields, (a) the particles conveyed may be of any material, magnetic or non-magnetic, as long as an electric charge is placed on their surface or internal polarization occurs;

(b) the device will move unipolarly charged, free material along the general path of the electric field lines and in the direction determined by the polarity of the charge and the direction of the electric field; and (c) the apparatus is capable of generating enormous accelerations on particles in the micron and submicron range.

Many modifications in the above described embodiment of the invention can be carried out without departing from the scope thereof and therefor the scope of the present invention is intended to be limited only by the appended claims.

I claim:

1. An electrostatic conveyor for charged particles comprising:
   duct means having an inlet, an outlet and a predetermined cross-section; and
   field generating means including electrode means along and within the length of the duct means and power supply means for generating travelling, curvilinear, AC fields across the duct means cross-section to move particles from the inlet to the outlet.

2. An electrostatic conveyor as claimed in claim 1 wherein the curvilinear direction of the fields is oriented in the conveying direction from the inlet to the outlet.

3. An electrostatic conveyor as claimed in claim 1 wherein the fields consist of two or more successively generated fields.

4. An electrostatic conveyor as claimed in claim 1 wherein the fields consist of two separate fields generated alternately at successive locations along the length of the duct.

5. An electrostatic conveyor for charged particles comprising:
   duct means having an inlet, an outlet and a predetermined cross-section; and
   field generating means including:
     electrode means located along the length of the duct means and having a conductive plate in the upper surface of the duct; and a succession of resistive electrode segments insulated from one another along the length of the lower surface of the duct; and
     power supply means connected to the resistive electrode segments in successive groups for generating travelling, curvilinear, AC fields across the duct means cross-section to move particles from the inlet to the outlet.

6. An electrostatic conveyor as claimed in claim 5 wherein the power supply alternately applies a first voltage to a first group of selected segments and a second voltage to a second group of selected segments interspersed with the first group.

7. An electrostatic conveyor as claimed in claim 6 wherein the first and second voltages are substantially identical.

* * * * *